May 19, 1953 F. LUIPERSBEK 2,638,716
FLOWERPOT
Filed Jan. 12, 1949
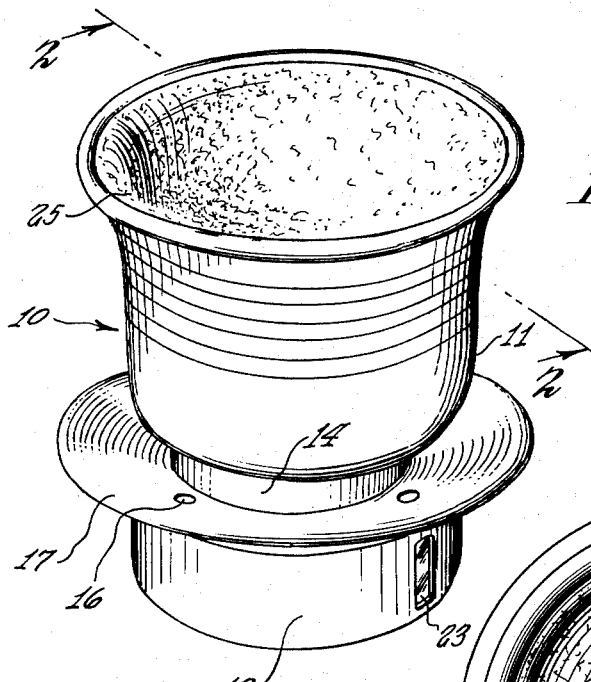
Fig.1
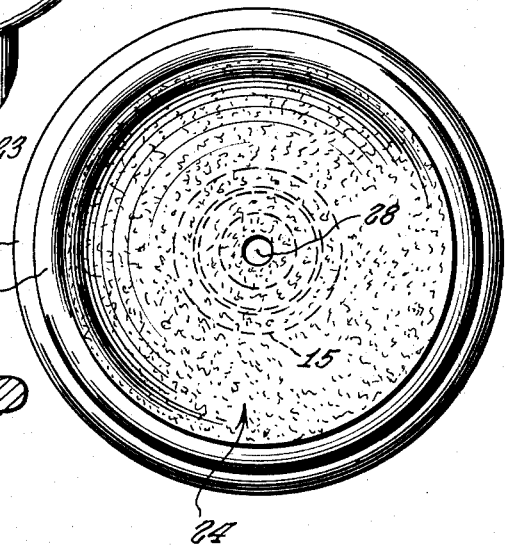
Fig.3
Fig.2
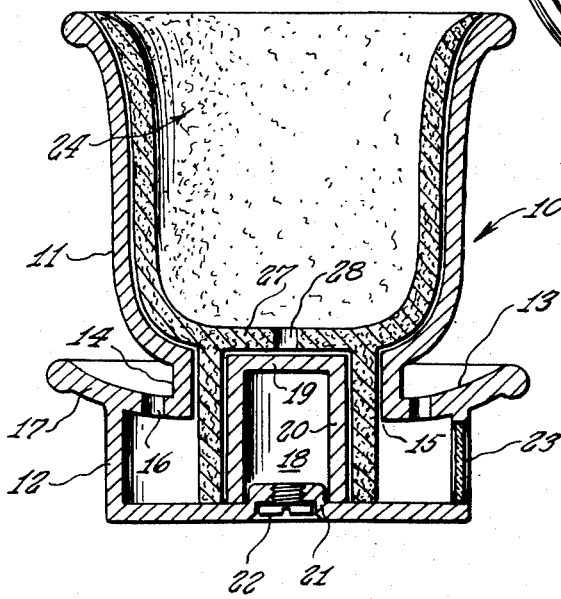
INVENTOR.
FRANK LUIPERSBEK
BY
J. Ledermann
ATTORNEY

UNITED STATES PATENT OFFICE 2,638,716

FLOWERPOT

Frank Luipersbek, New York, N. Y.

Application January 12, 1949, Serial No. 70,549

1 Claim. (Cl. 47—38)

This invention relates to nurturing flower pots, and the main object is the provision of a flower pot having an upper chamber for the soil in which the plant grows, and a lower and wider chamber adapted to contain water to provide moisture to the soil, together with a removable platform mounted on the base of the lower chamber and serving as a support for the soil.

Another object of the invention is the provision of an annular concave roof over the lower chamber, and further the provision of holes through the annular roof giving access into the lower chamber.

A further object of the invention is the provision of a water glass in the wall surrounding the lower chamber so that the level of water therein may be checked.

The above as well as additional objects will be clarified in the following description, wherein characters of reference refer to like-numbered parts in the accompanying drawing. It is to be noted that the drawing is intended solely for the purpose of illustration, and that it is neither desired nor intended to limit the invention necessarily to any or all of the exact details of construction shown except insofar as they may be deemed essential to the invention.

Referring briefly to the drawing,

Fig. 1 is a perspective view of the flower pot embodying this invention.

Fig. 2 is a sectional view taken on the line 2—2 of Fig. 1.

Fig. 3 is a plan view of the flower pot.

Referring in detail to the drawing, the numeral 10 indicates the flower pot of this invention, and includes an upper vase-like or bowl-like portion 11 and a lower substantially cylindrical hollow base 12. The base 12 has a concave annular roof 13, and a reduced substantially cylindrical neck 14 joins the upper and lower portions 11 and 12, respectively, to provide a unitary flower pot wherein communication between the upper and lower portions is provided by the passage or opening 15 through the neck 14. A plurality of spaced holes 16 pass through the roof 13, and the annular roof is extended radially beyond the upright wall of the base 12 in the form of an eave 17.

Insertible into the opening 15 and adapted to rest on the floor of the base 12, is a member 18 having the form of an inverted cylindrical cup, so that the floor of the cup serves as a platform 19 and the cylindrical wall of the cup serves as a support 20. A nipple 21 is provided in the center of the bottom of the base 12, and a removable threaded plug 22 normally closes the passage through the nipple. This plug may be removed, however, and the end of a feed pipe screwed into the said passage, when it is desired to mount the pot in that way or to provide means for feeding water into the pot in a convenient manner. A glass window 23 is provided in the wall of the base 12 so that the level of water within the base may be seen.

Mounted within the pot 10 is an inner member 24 comprising an upper portion 25 and a lower portion 26, the latter being cylindrical and of greater diameter than the cup 18 but of smaller diameter than the opening 15 so that it registers between the member 18 and the opening 15. A horizontal partition or floor 27 extends across the member 24 between the upper portion 25 and the lower portion 26, and this floor is provided with an axial opening 28 therethrough. It is to be noted that the upper portion 25 of the member 24 is substantially complementary in conformation to the upper portion 11 of the pot 10, and that the entire member 24, including the portions 25 and 26 as well as the floor 27, is made of one piece.

The soil is placed in the upper portion or bowl 25 and the plant is grown therein, with the roots in the bottom thereof or partly passing downward through the opening 28. When water flows into the pot through the nipple 21, it at first fills the inverted cup 20, then lifts the latter slightly so that water flows into the space between the cup 20 and the cylindrical portion 26 of the insert. The water then works its way upward through the said space and on to the roof 19 of the cup and thence upward through the opening 28. The water flow from the source, not shown, through the nipple 21 is of course at a very slow rate; the water is turned on and off from time to time.

Obviously, modifications in form or structure may be made without departing from the spirit or scope of the invention.

I claim:

A flower pot comprising an outer member and an inner member, said outer member comprising a bowl-like upper portion and a hollow substantially cylindrical base portion, said base portion including an annular concave approximately horizontal roof at the top and a bottom wall at the bottom, a reduced substantially cylindrical neck portion joining said annular roof with the lower rim of said upper portion, said roof extending radially beyond the periphery of said base portion thereby providing a circumferential eave extending from said roof, said roof having a plurality of openings therethrough, said inner member comprising an insert consisting of an upper portion substantially complementary to said bowl-like portion and a reduced cylindrical portion passing downward through said neck and resting loosely on said bottom wall, said insert having a horizontal partition therein at the junction of said upper and lower portions thereof, the external diameter of said insert at every horizontal level thereof being smaller than the internal diameter of said bowl-like portion and said neck at the said level thereby providing a space around said insert throughout the height thereof, said partition having an axial opening therethrough, an inverted cylindrical cup mounted in said lower cylindrical portion of the insert and resting on said bottom wall, an axially positioned nipple extending upward from said bottom wall and having a diameter slightly less than the internal diameter of said cup whence said nipple registers within the inverted rim of the cup and centers the cup, the external diameter of said cup being smaller than the internal diameter of said lower cylindrical portion of the insert thereby leaving a space around the cylindrical wall of the cup, the height of said cup being less than the distance between said bottom wall and said partition thereby leaving a space between the inverted bottom of the cup and said partition, said nipple having a passage therethrough.

FRANK LUIPERSBEK.

References Cited in the file of this patent

UNITED STATES PATENTS

| Number | Name | Date |
|---|---|---|
| 165,000 | Johnson | June 29, 1875 |
| 616,968 | Price | Jan. 3, 1899 |
| 1,216,642 | White | Feb. 20, 1917 |
| 1,450,633 | Hudson | Apr. 3, 1923 |
| 1,789,616 | Bjorklund | Jan. 20, 1931 |
| 1,948,031 | Guille | Feb. 20, 1934 |
| 2,057,972 | Pieck | Oct. 20, 1936 |
| 2,228,575 | Luipersbek | Jan. 14, 1941 |

FOREIGN PATENTS

| Number | Country | Date |
|---|---|---|
| 148,819 | Germany | Mar. 2, 1904 |